United States Patent
Sasai

(10) Patent No.: US 10,963,509 B2
(45) Date of Patent: Mar. 30, 2021

(54) UPDATE METHOD AND UPDATE APPARATUS

(71) Applicant: YAMAHA CORPORATION, Shizuoka (JP)

(72) Inventor: Dan Sasai, Shizuoka (JP)

(73) Assignee: YAMAHA CORPORATION, Shizuoka (JP)

( * ) Notice: Subject to any disclaimer, the term of this patent is extended or adjusted under 35 U.S.C. 154(b) by 263 days.

(21) Appl. No.: 16/086,055

(22) PCT Filed: Mar. 10, 2017

(86) PCT No.: PCT/JP2017/009766
§ 371 (c)(1),
(2) Date: Sep. 18, 2018

(87) PCT Pub. No.: WO2017/159569
PCT Pub. Date: Sep. 21, 2017

(65) Prior Publication Data
US 2020/0293572 A1    Sep. 17, 2020

(30) Foreign Application Priority Data

Mar. 18, 2016  (JP) .............................. JP2016-055045

(51) Int. Cl.
*G06F 16/65*      (2019.01)
*G06F 16/638*     (2019.01)
*G06F 16/635*     (2019.01)

(52) U.S. Cl.
CPC .......... *G06F 16/639* (2019.01); *G06F 16/637* (2019.01); *G06F 16/65* (2019.01)

(58) Field of Classification Search
None
See application file for complete search history.

(56) References Cited

U.S. PATENT DOCUMENTS

| | | | | |
|---|---|---|---|---|
| 9,219,634 | B1* | 12/2015 | Morse | H04L 67/06 |
| 2004/0255761 | A1* | 12/2004 | Yamane | G06F 16/683 |
| | | | | 84/615 |
| 2005/0219963 | A1* | 10/2005 | Fujisawa | G06F 16/40 |
| | | | | 369/30.05 |

(Continued)

FOREIGN PATENT DOCUMENTS

| | | |
|---|---|---|
| CN | 1987867 A | 6/2007 |
| JP | 2003-178088 A | 6/2003 |

(Continued)

OTHER PUBLICATIONS

Notice of Reasons for Refusal in JP 2016-055045 dated Mar 12, 2020.

(Continued)

*Primary Examiner* — Wilson Lee
(74) *Attorney, Agent, or Firm* — Chip Law Group

(57) ABSTRACT

An update method includes acquiring a list of plural pieces of content selected from a library including plural pieces of content, selecting, from the list, first content to be deleted from the list, selecting, from the library, second content to be interchanged with the first content based on details of the list, and interchanging the first content with the second content in the list.

12 Claims, 3 Drawing Sheets

(56) References Cited

U.S. PATENT DOCUMENTS

| | | | |
|---|---|---|---|
| 2007/0025704 A1* | 2/2007 | Tsukazaki | G06F 16/61 386/230 |
| 2007/0033147 A1* | 2/2007 | Kaburagi | H04L 67/06 705/59 |
| 2007/0143268 A1 | 6/2007 | Chosokabe | |
| 2008/0071832 A1 | 3/2008 | Sugiura et al. | |
| 2009/0307252 A1* | 12/2009 | Iwatsu | G06Q 30/0603 |
| 2009/0327349 A1* | 12/2009 | Fukuda | G06F 16/686 |
| 2011/0299837 A1* | 12/2011 | Mae | G11B 20/00007 386/326 |
| 2013/0212477 A1* | 8/2013 | Averbuch | H04N 21/47815 715/719 |
| 2013/0262458 A1* | 10/2013 | Saito | G06F 16/639 707/731 |
| 2014/0195675 A1* | 7/2014 | Silver | H04L 65/607 709/224 |
| 2014/0359470 A1* | 12/2014 | Lin | H04N 21/00 715/745 |
| 2015/0193196 A1* | 7/2015 | Lin | H04R 3/04 715/716 |

FOREIGN PATENT DOCUMENTS

| | | |
|---|---|---|
| JP | 2005276311 A | 10/2005 |
| JP | 2006-243854 A | 9/2006 |
| JP | 2006243854 A | 9/2006 |
| JP | 2006-268100 A | 10/2006 |
| JP | 2006268100 A | 10/2006 |
| JP | 2007-102981 A | 4/2007 |
| JP | 2007102981 A | 4/2007 |
| JP | 2007157243 A | 6/2007 |
| JP | 2007-172138 A | 7/2007 |
| JP | 2007172138 A | 7/2007 |
| JP | 2008-059383 A | 3/2008 |
| JP | 2008059383 A | 3/2008 |
| KR | 10-2007-0065798 A | 6/2007 |

OTHER PUBLICATIONS

International Search Report and Written Opinion of PCT Application No. PCT/JP2017/009766, dated Apr. 18, 2017, 02 page of English Translation and 07 pages of ISRWO.

* cited by examiner

FIG.4

| CONTENT IDENTIFIER | THE NUMBER OF TIMES OF REPRODUCTION | THE NUMBER OF TIMES OF SKIP |
|---|---|---|
| 002153 | 20 | 0 |
| 00584 | 10 | 3 |
| 000002 | 2 | 10 |
| 001438 | 18 | 1 |
| ⋮ | ⋮ | ⋮ |

FIG.5

| CONTENT IDENTIFIER | KEY | TEMPO | TONE COLOR | TITLE | ARTIST | CLUSTER |
|---|---|---|---|---|---|---|
| 000001 | C | 100 | ... | SAKURA | TARO YAMADA | A |
| 000002 | Em | 65 | ... | today | John Smith | B |
| 000003 | Am | 70 | ... | rain | John Smith | B |
| 000004 | D | 120 | ... | GO | JIRO SATO | C |
| ⋮ | ⋮ | ⋮ | ⋮ | ⋮ | ⋮ | ⋮ |

UPDATE METHOD AND UPDATE APPARATUS

TECHNICAL FIELD

The present invention relates to a technique of updating a list of a plurality of pieces of content.

The present application claims the priority based on Japanese Patent Application No. 2016-055045, filed in Japan on Mar. 18, 2016, the contents of which are incorporated herein by reference.

BACKGROUND ART

A reproducing apparatus that reproduces content of music data or the like is known. In association with increase in the capacity of a storage and development of cloud computing techniques, it is possible to reproduce an enormous number of pieces of content in this kind of reproducing apparatus. In reproduction of content, a list of pieces of content selected by a user (so-called playlist) is often used. The user creates a list of user's favorite pieces of content from pieces of content that can be reproduced. The reproducing apparatus reproduces content registered in this list. For example, in PTL 1, a technique of automatically creating a playlist suitable for user's preference is described.

CITATION LIST

Patent Literature

[PTL 1]
  JP 2003-178088A

SUMMARY

Technical Problem

In the technique described in PTL 1, there is a problem that, unless a user edits a list created once, pieces of content included in the list are fixed.

The present invention provides a technique of updating a list of pieces of content according to the details of the list.

Solution to Problem

An update method according to an embodiment of the present invention includes acquiring a list of a plurality of pieces of content selected from a library including a plurality of pieces of content, selecting, from the list, first content to be deleted from the list, selecting, from the library, second content to be interchanged with the first content based on details of the list, and interchanging the first content with the second content in the list.

An update apparatus according to an embodiment of the present invention includes a first selecting unit that acquires a list of a plurality of pieces of content selected from a library including a plurality of pieces of content and selects, from the list, first content to be deleted from the list, a second selecting unit that selects, from the library, second content to be interchanged with the first content based on details of the list, and an interchanging unit that interchanges the first content with the second content in the list.

Advantageous Effect of Invention

According to the present invention, a list of pieces of content can be updated based on the details of the list.

BRIEF DESCRIPTION OF DRAWINGS

FIG. 4 is a diagram exemplifying a reproduction history in a playlist in the embodiment.

FIG. 5 is a diagram exemplifying attributes of content in the embodiment.

DESCRIPTION OF EMBODIMENT

1. Configuration

Figure 1:
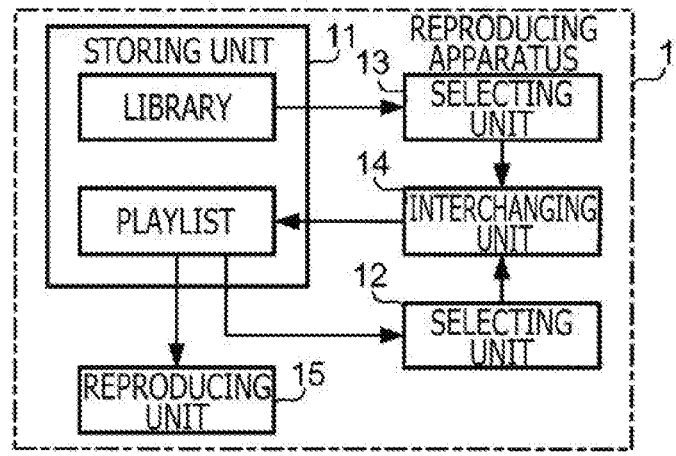
FIG. 1 is a diagram exemplifying the functional configuration of a reproducing apparatus according to one embodiment.

FIG. 1 is a diagram exemplifying the functional configuration of a reproducing apparatus 1 according to one embodiment. The reproducing apparatus 1 reproduces content included in a list (hereinafter, referred to as "playlist") of pieces of content selected from a content group by a user. The reproducing apparatus 1 includes a storing unit (storing means) 11, a selecting unit (selecting means, first selecting unit) 12, a selecting unit (selecting means, second selecting unit) 13, an interchanging unit (interchanging means) 14, and a reproducing unit (reproducing means) 15. The playlist may be automatically created from a content group based on a predetermined condition. The predetermined condition may be a condition that 10 pieces of content with a specific attribute are selected.

The storing unit 11 stores various kinds of data. In this example, the storing unit 11 stores a library of content. The library of content refers to a collection of plural pieces of content stored in a data format that allows reproduction by the reproducing apparatus 1. The content refers to a file of music data or moving image data. The storing unit 11 further stores a playlist. The playlist refers to a list of pieces of content selected from the library of content by a user.

The selecting unit 12 selects content to be deleted (hereinafter, referred to as "deletion content," one example of first content) from the playlist. The selecting unit 13 selects content to be interchanged with the deletion-target content (hereinafter, referred to as "addition content," one example of second content) from the library based on the details of the playlist. The interchanging unit 14 interchanges deletion content and addition content in the playlist stored in the storing unit 11. By interchanging the deletion content and the addition content, the playlist (list) is updated.

The reproducing unit 15 reproduces content included in the playlist one by one. The order of reproduction of content is random order (so-called shuffle reproduction), for example. Alternatively, the playlist includes information that depicts the order of reproduction and the reproducing unit 15 may reproduce content in accordance with this order.

Figure 2:
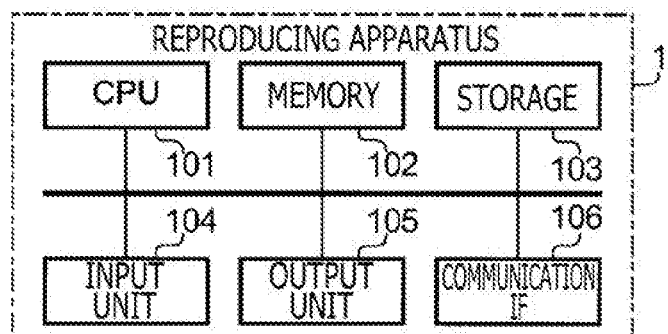
FIG. 2 is a diagram exemplifying the hardware configuration of the reproducing apparatus depicted in FIG. 1.

FIG. 2 is a diagram exemplifying the hardware configuration of the reproducing apparatus 1. The reproducing apparatus 1 is a computer apparatus, e.g. a smartphone. The reproducing apparatus 1 includes a central processing unit (CPU) 101, a memory 102, a storage 103, an input unit 104, an output unit 105, and a communication interface (IF) 106. The CPU 101 is a control apparatus that controls other constitute elements of the reproducing apparatus 1. The memory 102 is a volatile storing apparatus that functions as a work space when the CPU 101 executes a program. The storage 103 is a non-volatile storing apparatus that stores various kinds of data and programs. The input unit 104 is an input apparatus that accepts input of a command or information from a user and includes at least one of touch sensor, button, and microphone, for example. The output unit 105 is an output apparatus that outputs information to the external and includes at least one of display and speaker, for example. The communication IF 106 is an interface for communicating with other apparatuses, e.g. a server apparatus (not depicted) on a network.

In this example, the storage 103 stores a program for causing a computer apparatus to function as the reproducing apparatus 1 (hereinafter, referred to as "reproduction program"). The CPU 101 executes this reproduction program and thereby the functions depicted in FIG. 1 are implemented. The memory 102 and the storage 103 are one example of the storing unit 11. The CPU 101 that is executing this program is one example of the selecting unit 12, the selecting unit 13, the interchanging unit 14, and the reproducing unit 15.

2. Operation

Figure 3:
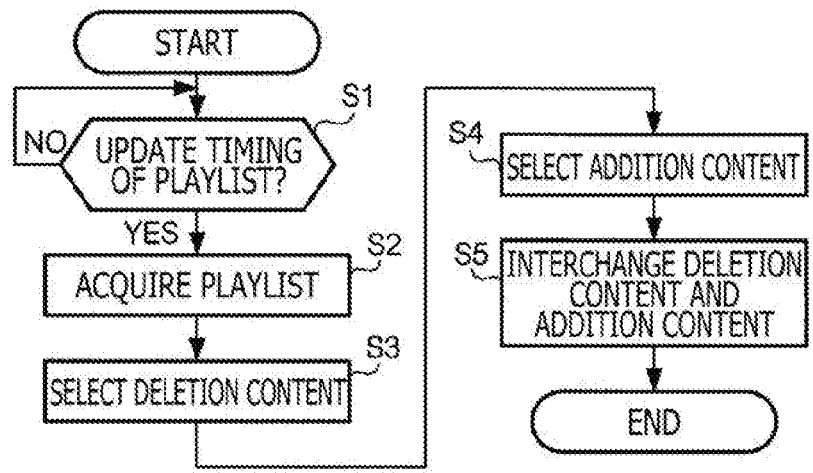
FIG. 3 is a flowchart exemplifying operation according to one embodiment of the reproducing apparatus depicted in FIG. 1.

FIG. 3 is a flowchart exemplifying operation according to one embodiment of the reproducing apparatus 1. This flow relates to an update method of a list of pieces of content in the reproducing apparatus 1. The start of this flow is triggered by making of an instruction to activate the reproduction program by a user, for example. In this example, a playlist has been created by the user in advance. Specifically, the user manually specifies pieces of content to be included in the playlist to create the playlist. This playlist is stored in the storing unit 11.

In a step S1, the selecting unit 12 determines whether update timing of the playlist has been reached. For example, the update timing of the playlist is when update of the playlist is explicitly ordered by the user, or when a predetermined time has elapsed from the previous update, or when one round of reproduction of the pieces of content in the playlist has ended. If it is determined that update timing of the playlist has not yet been reached (S1: NO), the selecting unit 12 waits until update timing of the playlist is reached. If it is determined that update timing of the playlist has been reached (S1: YES), the selecting unit 12 makes a transition of the processing to a step S2.

In the step S2, the selecting unit 12 acquires the playlist from the storing unit 11. In a step S3, the selecting unit 12 selects deletion content from the playlist. In this example, the selecting unit 12 selects the deletion content based on a reproduction history in the playlist.

FIG. 4 is a diagram exemplifying the reproduction history in the playlist. Data of the reproduction history is stored in the storing unit 11. The reproduction history includes an identifier, the number of times of reproduction, and the number of times of skip of content. The number of times of reproduction indicates the number of times the corresponding content has been reproduced from the beginning to the last. The number of times of skip indicates the number of times a user has input an instruction to skip (or fast-forward) reproduction in the middle of reproduction of the corresponding content and the next content has been reproduced. The reproducing unit 15 manages reproduction of content. The reproducing unit 15 rewrites a table of FIG. 4 according to the reproduction status of content or instruction input by a user. For example, when reproduction of certain content is started, the reproducing unit 15 adds "1" to "the number of times of skip" corresponding to the content. When the content is reproduced to the last, the reproducing unit 15 subtracts "1" from "the number of times of skip" corresponding to the content and adds "1" to "the number of times of reproduction."

The selecting unit 12 selects content whose reproduction history satisfies a predetermined condition as the deletion content from the playlist. This condition is a condition that the number of times of skip is the highest frequency. This condition may be a condition that the ratio of the number of times of skip to the number of times of reproduction is the highest. This condition may be a condition that the number of times of reproduction is the smallest frequency. This condition may be a condition that the ratio of the number of times of reproduction to the number of times of skip is the lowest.

Referring back to FIG. 3, in a step S4, the selecting unit 13 selects addition content. In this example, the selecting unit 13 selects content similar to the deletion content among the pieces of content included in the library as the addition content. Determination of whether or not content is similar is carried out based on attributes of the content.

FIG. 5 is a diagram exemplifying attributes of content. Here, description will be made by using an example in which content is music data. In this example, the attributes of content include identifier, key, tempo, tone color, music title, artist name, and cluster name of the content. At least part of these attributes (for example, music title and artist name) is given by the provider of the content. Part of the attributes (for example, key, tempo, tone color, and cluster name) is given through analysis of data of the content (in this example, sound data that represents music) by the reproducing apparatus 1. These pieces of data may be added to the data of the content as metadata or may be stored in a format of a table separately from the file of the content.

The key is information that represents the musical tonality (key) of the music and is the C major key, the A minor key, or the like, for example. The tempo is information that represents the speed of the beat of the music and is beats per minute (BPM), for example. The tone color is information that represents the tone color of performance sound of the music and is mel-frequency cepstrum coefficients (MFCC), for example. The music title is information that represents a title given to the music. The artist name is information that represents the performer, composer, lyric writer, or conductor of the music. The cluster name is information to identify a cluster when clustering (grouping) of the pieces of content included in the library is carried out into each collection of pieces of content whose attributes are similar. It can be said that two pieces of content having the same cluster name are similar to each other.

Figure 6:
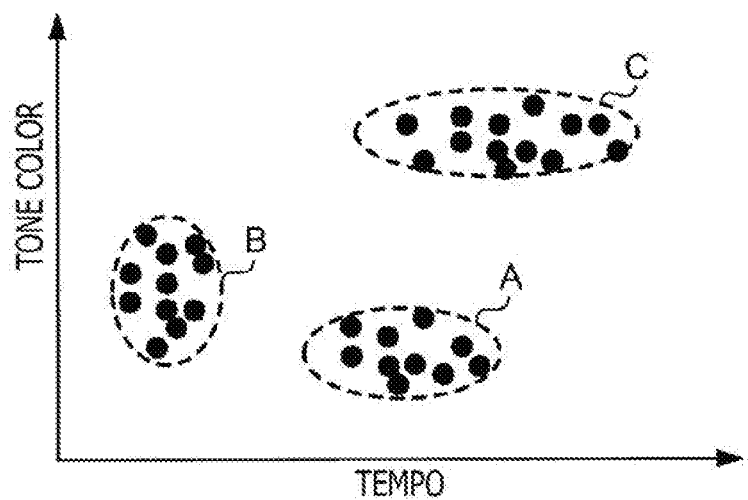
FIG. 6 is a diagram exemplifying clustering of pieces of content in the embodiment.

FIG. 6 is a diagram exemplifying clustering of pieces of content. In the case of carrying out the clustering based on n kinds of attributes, each piece of content is plotted into the n-dimensional space (hereinafter, referred to as "attribute space"). These plotted pieces of content are subjected to the clustering by a well-known method such as the k-means method, minimum average variance method, or minimum distance method. Here, for simplification of the drawing, an example in which clustering of pieces of content is carried out by using two kinds of attributes (tone color and tempo). Plural pieces of content are classified into any of three clusters of cluster A, cluster B, and cluster C.

The selecting unit 13 selects the addition content from the pieces of content that belong to the same cluster as the deleted cluster and are not included in the playlist at the present timing among the pieces of content included in the library. If plural pieces of content that satisfy this condition exist, the selecting unit 13 selects the content whose distance from the deletion content in the attribute space is the shortest as the addition content, for example. Alternatively, the selecting unit 13 may randomly select content to become the addition content from the pieces of content whose distance from the deletion content in the attribute space is equal to or shorter than a threshold.

Referring back to FIG. 3, in a step S5, the interchanging unit 14 interchanges the deletion content and the addition content in the playlist. Specifically, the interchanging unit 14 deletes the deletion content from the playlist and adds the addition content to the playlist. Upon the completion of the interchange of the pieces of content, the interchanging unit 14 ends the flow of FIG. 3. Part of the steps S1 to S5 depicted in FIG. 3 may be omitted. For example, the processing of the step S1 may be omitted and the processing of the steps S2 to S5 may be executed.

According to the present embodiment, content included in the playlist is automatically interchanged according to the reproduction history. If the pieces of content included in the playlist are fixed, the user often gets bored with the playlist. However, this is suppressed according to the present embodiment. Furthermore, the addition content is selected according to attributes of the deletion content and thus the uniformity and concept of the playlist itself are kept. For example, in a playlist made by collecting only pieces of hard rock style music, hard rock style music is selected as addition content and the concept of the playlist itself can be kept.

3. Modification Examples

The present invention is not limited to the above-described embodiment and can be carried out with various modifications. Several modification examples will be described below. Two or more modification examples in the following modification examples may be used in combination.

Figure 7:
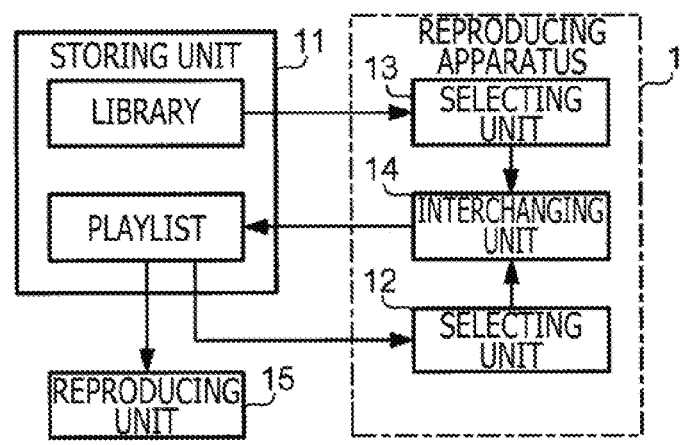
FIG. 7 is a diagram depicting a reproducing apparatus and an external apparatus according to a modification example of the embodiment.

In the example of the embodiment, a single apparatus has all functions in FIG. 1. However, the functions in FIG. 1 may be separately implemented in a client apparatus and a server apparatus. For example, the storing unit 11, the selecting unit 12, the selecting unit 13, and the interchanging unit 14 may be implemented in the server apparatus and the reproducing unit 15 may be implemented in the client apparatus. Furthermore, the library of content and the playlist may be stored in different storing units. For example, a storing unit of the server apparatus may store the library of content and a storing unit of the client apparatus may store the playlist. As another configuration, as depicted in FIG. 7, the reproducing apparatus 1 may include the selecting unit 12, the selecting unit 13, and the interchanging unit 14 and the storing unit 11 and the reproducing unit 15 may be provided outside the reproducing apparatus 1.

Attributes of content are not limited to the attributes exemplified in the embodiment. For example, attributes of content may include information on rating, lyrics, composer name, lyric writer name, album title, date in which the content has been released, country in which the content has been released, and so forth.

The hardware configuration of the reproducing apparatus 1 is not limited to the configuration exemplified in FIG. 2. The reproducing apparatus 1 may have any hardware configuration as long as the hardware configuration is a configuration having necessary functions. The reproducing apparatus 1 may be a computer apparatus other than the smartphone, such as portable music player, tablet terminal, or desktop computer.

The program executed by the CPU 101 and so forth of the reproducing apparatus 1 may be provided by a storage medium such as an optical disc, magnetic disc, or semiconductor memory or may be downloaded through a communication line such as the Internet. Furthermore, this program does not need to include all steps in FIG. 3. For example, this program may include only the step S1, the step S3, and the step S4.

The update method according to the embodiment has acquiring a list of a plurality of pieces of content selected from a library including a plurality of pieces of content, selecting, from the list, first content to be deleted from the list, selecting, from the library, second content to be interchanged with the first content based on details of the list, and interchanging the first content with the second content in the list. The list of the plurality of pieces of content selected from the library may be a list of a plurality of pieces of content selected from the library by a user. The second content may be selected from one or more pieces of content similar to the first content among the plurality of pieces of content included in the library. The one or more pieces of content similar to the first content may be one or more pieces of content that belong to the same cluster as the first content. The first content may be selected according to a reproduction history of each of the plurality of pieces of content in the list. The update method may further include determining whether present timing is timing to update the list. The list may be acquired if it is determined that the present timing is timing to update the list. The details of the list may include an attribute of the first content.

The update apparatus according to the embodiment includes a first selecting unit that acquires a list of a plurality of pieces of content selected from a library including a plurality of pieces of content and selects, from the list, first content to be deleted from the list, a second selecting unit that selects, from the library, second content to be interchanged with the first content based on details of the list, and an interchanging unit that interchanges the first content with the second content in the list. The list of the plurality of pieces of content selected from the library may be a list of a plurality of pieces of content selected from the library by a user. The second selecting unit may select the second content from one or more pieces of content similar to the first content among the plurality of pieces of content included in the library. The one or more pieces of content similar to the first content may be one or more pieces of content that belong to the same cluster as the first content. The second selecting unit may select the first content according to a reproduction history of each of the plurality of pieces of content in the list. The first selecting unit may determine whether present timing is timing to update the list. The first selecting unit may acquire the list if it is determined that the present timing is timing to update the list. The details of the list may include an attribute of the first content.

INDUSTRIAL APPLICABILITY

The present invention may be applied to an update method and an update apparatus.

REFERENCE SIGNS LIST

1 . . . Reproducing apparatus
11 . . . Storing unit
12 . . . Selecting unit
13 . . . Selecting unit
14 . . . Interchanging unit
15 . . . Reproducing unit
101 . . . CPU
102 . . . Memory
103 . . . Storage
104 . . . Input unit
105 . . . Output unit
106 . . . Communication IF

The invention claimed is:

1. An update method comprising:
acquiring, from a memory, a list of content selected from a library including a plurality of pieces of content;
acquiring, from the memory, a reproduction history of each content in the list, the reproduction history including a number of times of reproduction and a number of times of skip of each content in the list, wherein
the number of times of skip indicates the number of times a reproduction of a corresponding content in the list is skipped in the middle of the reproduction to a next content in the list;
selecting a first content to be deleted from the list based on the reproduction history of the first content that satisfies a determined condition;
selecting, from the library, a second content to be interchanged with the first content, wherein
the selection of the second content is based on at least one attribute of the first content,
the second content is selected from one or more pieces of content among the plurality of pieces of content in the library, and
the one or more pieces of content have an attribute similar to the at least one attribute of the first content; and
interchanging the first content with the selected second content in the list.

2. The update method according to claim 1, wherein the list of content selected from the library is selected from the library by a user.

3. The update method according to claim 1, wherein the one or more pieces of content similar to the first content belong to a same cluster as the first content.

4. The update method according to claim 1, further comprising:
determining whether one round of reproduction of pieces of content in the list has ended; and
determining whether present timing is timing to update the list based on the determination that the one round of reproduction of the pieces of content in the list has ended, wherein
the list is acquired based on the determination that the present timing is the timing to update the list.

5. The update method according to claim 1, wherein the at least one attribute of the first content includes a music title, an artist name, a key, a tempo, or a tone color of the first content.

6. An update apparatus, comprising:
a non-transitory computer-readable medium having stored thereon, computer-executable instructions which, when executed by a processor, cause the processor to:
acquire, from a memory, a list of content selected from a library including a plurality of pieces of content;
acquire, from the memory, a reproduction history of each content in the list, the reproduction history including a number of times of reproduction and a number of times of skip of each content in the list, wherein
the number of times of skip indicates the number of times a reproduction of a corresponding content in the list is skipped in the middle of the reproduction to a next content in the list;
select a first content to be deleted from the list based on the reproduction history of the first content that satisfies a determined condition;
select, from the library, a second content to be interchanged with the first content, wherein
the selection of the second content is based on at least one attribute of the first content,
the second content is selected from one or more pieces of content among the plurality of pieces of content in the library, and
the one or more pieces of content have an attribute similar to the at least one attribute of the first content; and
interchange the first content with the selected second content in the list.

7. The update apparatus according to claim 6, wherein the list of content selected from the library is selected from the library by a user.

8. The update apparatus according to claim 6, wherein the one or more pieces of content similar to the first content belong to a same cluster as the first content.

9. The update apparatus according to claim 6, wherein the computer-executable instructions which, when executed by the processor, causes the processor to:
determine whether one round of reproduction of pieces of content in the list has ended;
determine whether present timing is timing to update the list based on the determination that the one round of reproduction of the pieces of content in the list has ended; and
acquire the list based on the determination that the present timing is the timing to update the list.

10. The update apparatus according to claim 6, wherein the at least one attribute of the first content includes a music title, an artist name, a key, a tempo, or a tone color of the first content.

11. The update method according to claim 1, wherein the determined condition indicates that a ratio of the number of times of reproduction to the number of times of skip of the first content is the lowest among pieces of content in the list.

12. The update method according to claim 1, wherein the determined condition indicates that a ratio of the number of times of skip to the number of times of reproduction of the first content is the highest among pieces of content in the list.

* * * * *